United States Patent [19]
Chen

[11] Patent Number: 6,091,548
[45] Date of Patent: Jul. 18, 2000

[54] OPTICAL SYSTEM WITH TWO-STAGE ABERRATION CORRECTION

[75] Inventor: Chungte W. Chen, Irvine, Calif.

[73] Assignee: Raytheon Company, Lexington, Mass.

[21] Appl. No.: 08/941,486

[22] Filed: Oct. 1, 1997

[51] Int. Cl.[7] .................................................. G02B 27/14
[52] U.S. Cl. ........................................................ 359/637
[58] Field of Search ................................ 359/637, 44.23, 359/630, 632

[56] References Cited

U.S. PATENT DOCUMENTS

| | | | |
|---|---|---|---|
| 4,705,343 | 11/1987 | Simons | 359/344 |
| 5,526,181 | 6/1996 | Kunick et al. | 359/613 |
| 5,726,436 | 3/1998 | Oka et al. | 359/637 |
| 5,793,735 | 8/1998 | Oono | 359/116 |

FOREIGN PATENT DOCUMENTS 0 848 273 A2  6/1998  European Pat. Off. .

OTHER PUBLICATIONS

Buchroeder, Richard A., Hooker, Brian R., "Aberration Generator", Applied Optics, vol. 14, No. 10, Oct. 1975).

*Primary Examiner*—Ricky Mack
*Attorney, Agent, or Firm*—Colin M. Raufer; Leonard A. Alkov; Glenn H. Lenzen, Jr.

[57] ABSTRACT

An optical system includes a two-stage aberration corrector having a static corrector lying on the optical path and a dynamic corrector lying on the optical path. The static corrector is fixed and is selected to correct the fixed aberration component of an optical beam. The dynamic corrector is controllably variable to correct the variable, angle-dependent aberration component of the beam. The dynamic corrector includes an astigmatism generator, a power generator, and a coma generator. The optical system also includes a window through which the optical path passes prior to reaching the aberration corrector, and a sensor in the optical path after the beam passes through the aberration corrector.

21 Claims, 3 Drawing Sheets

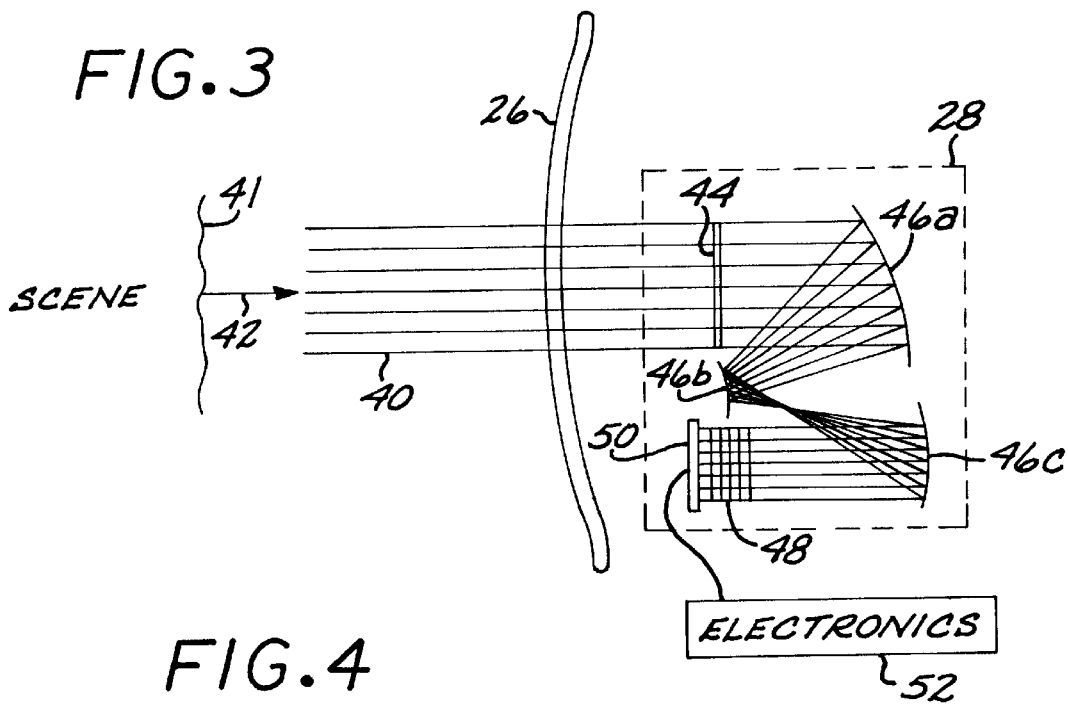
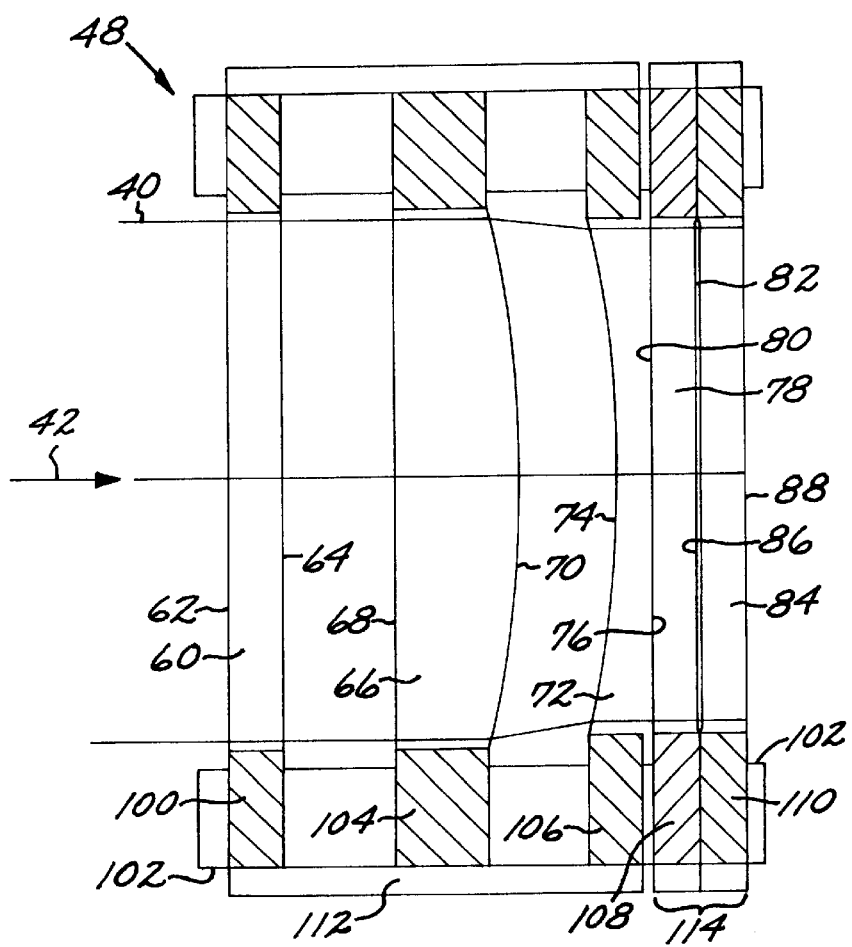

OPTICAL SYSTEM WITH TWO-STAGE ABERRATION CORRECTION

BACKGROUND OF THE INVENTION

This invention relates to optical systems, and, more particularly, to an optical system having static and dynamic aberration correction.

An optical sensor receives radiated energy from a scene and converts it to an electrical signal. The electrical signal is provided to a display or further processed for pattern recognition or the like. Optical sensors are available in a variety of types and for wavelengths ranging from the ultraviolet, through the visible, and into the infrared. Optical sensors are used in a variety of commercial and military applications. In some applications the optical sensors are fixed in orientation, and in others the optical sensor is movable such as by a pivoting motion to allow sensing over a wide angular range.

The optical sensors generally employ a photosensitive material that faces the scene and produces an electrical output responsive to the incident energy. The photosensitive material and the remainder of the sensor structure are rather fragile, and are easily damaged by dirt, erosion, chemicals, or high air velocity. The sensor is therefore placed behind a window through which it views the scene and which protects the sensor from such external agents. The window must be transparent to the radiation of the operating wavelength of the sensor and resist attack from the external forces. The window must also permit the sensor to view the scene over the specified field of regard, which is the angular extent over which the sensor must be able to view the scene. The field of regard may extend over wide angles and in two rotational directions. For example, a movable look-down sensor on a high-speed aircraft must have a field of regard that extends over specified pointing angles from front-to-back (elevation angle) and from side-to-side (azimuthal angle).

Desirably, the window introduces minimal wavefront distortion of the scene over the field of regard of the sensor, particularly if the sensor is an imaging sensor. The larger and thicker the window, however, the more likely is the introduction of wavefront distortion. It is not currently possible to design a window that is both aerodynamically acceptable and also avoids the introduction of wavefront distortion by the window in practical applications. For conformal windows that have relatively good aerodynamic properties, the amount and type of wavefront distortion vary widely as a function of the pointing angle of the sensor relative to the window. For example, the wavefront distortion of the image when the sensor is pointed straight down is quite different from that when the sensor is pointed at a large azimuthal angle to the side.

Where there is wavefront distortion introduced by the window, as is always the case to some degree, it is desirable that such wavefront distortion be correctable.

One approach to correction of aberration is through electrical manipulation of the output signal of the sensor in an attempt to at least partially negate the distortion produced by the window. While operable to some extent, electronic aberration correction has a limited dynamic range due to the limitations of digital electronic signal processing. Additionally, the application of complex correction algorithms slows the processing of the image.

Another approach is to provide an optical corrector that alters the image before it reaches the sensor so as to at least partially negate the effects of the wavefront distortion caused by the window through the introduction of a counter-distortion in the optical beam. For use with conformal windows, such a corrector must be dynamic in nature so as to be adjustable according to the pointing angle of the sensor. It must have a wide dynamic range to accommodate the wide range of distortions encountered as a function of the pointing angle of the sensor.

Dynamic optical correctors such as deformable mirrors and dynamic coma and astigmatism correctors are known. See, for example, U.S. Pat. No. 5,526,181. The available dynamic optical correctors are operable for some applications. However, deformable mirrors are very complex and costly, and have a limited range of operation. The dynamic aberration corrector of the '181 patent is an important advance in the art and is useful for some window configurations. Since that development, however, conformal windows with better aerodynamic properties, and associated greater requirements for aberration correction, are under development. The dynamic aberration correction of the '181 patent is insufficient to meet the performance demands of these advanced conformal windows, and a better approach is now required.

There is a need for an improved dynamic optical corrector. The present invention fulfills this need, and further provides related advantages.

SUMMARY OF THE INVENTION

This invention provides a dynamic optical corrector having a wide dynamic range that allows it to provide appropriate counter-distortions to a beam over a wide field of regard of a sensor mounted behind a window. The optical corrector provides correction for astigmatism, focus, and coma effects in a controllable manner. It employs only lenses to achieve the optical correction effects, although it may be used in conjunction with mirrors and other lenses for beam shaping and positioning. The dynamic optical corrector utilize lenses of fixed geometry, rather than variable-geometry components such as deformable mirrors.

In accordance with the invention, an optical system having an optical path along which a beam travels comprises an aberration corrector, including a static corrector lying on the optical path, and a dynamic corrector lying on the optical path, the dynamic corrector being controllably variable to correct aberration in the beam. The optical system also typically includes a window through which the beam passes before reaching the optical corrector, a sensor upon which the beam impinges after passing through the optical corrector, and beam positioning and shaping optics.

The present invention recognizes that the total aberration of the beam may be viewed as a fixed portion and a variable portion. The fixed portion is preferably a component that is independent of the pointing angle of the sensor, and the variable portion is preferably a component that is dependent upon the pointing angle of the sensor. The static corrector is designed to correct for the fixed portion of the aberration, and the dynamic corrector is designed to correct for the variable portion of the aberration. Because the major fixed portion of the aberration is corrected by the static corrector, the dynamic corrector may be optimized to correct for the variable portion of the aberration over a wide dynamic range.

In a preferred design of the optical system, the static corrector employs one or more lenses in a fixed position. However, more than one static corrector may be used. That is, a first static corrector may be provided for low range of azimuthal pointing angles of the sensor, an second static corrector for an intermediate range of azimuthal pointing angles, and so on. The dynamic corrector then functions to correct for angular variations within each of those broader ranges. Acting together, the tandem static and dynamic correctors achieve a much broader dynamic range of aberration correction than could a dynamic corrector acting by itself.

The dynamic corrector includes beam correction using an astigmatism generator, a power (focus) generator, and a coma generator. All three types of correction generators produce an optical counter-distortion that is adjustable according to the expected distortion of the incoming beam. The expected distortion of the incoming beam can usually be determined by calibration procedures for the specific application. For example, in the preferred application of a sensor positioned behind a window in an aircraft look-down sensor, the expected distortion varies according to configuration of the window and to the elevation and azimuth pointing angles of the sensor and the resulting angle at which the beam passes through the window.

The dynamic corrector preferably employs a multi-lens set. The positions of these lenses may be controllably varied in relation to each other to provide an angularly variable correction in relation to an angularly constant correction of the static corrector. In a most preferred design, the dynamic corrector has five lenses. Facing lens surfaces are ground to specific curvatures. The lenses may be moved as necessary, linearly parallel to the optical axis, linearly perpendicular to the optical axis, or rotationally, to dynamically vary the nature, degree, and angle of the counter-distortion produced by the set of lenses. Together, the static corrector and the dynamic corrector provide an effective counter-distortion of the beam to correct the distortion produced as the beam passes through the window.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

BRIEF DESCRIPTION OF THE DRAWINGS

FIG. 3 is a schematic ray-path illustration of the optical system of FIGS. 2A–2B, in a side view;

FIG. 4 is a detail view of the dynamic corrector portion of the optical system.

DETAILED DESCRIPTION OF THE INVENTION

Figure 1:
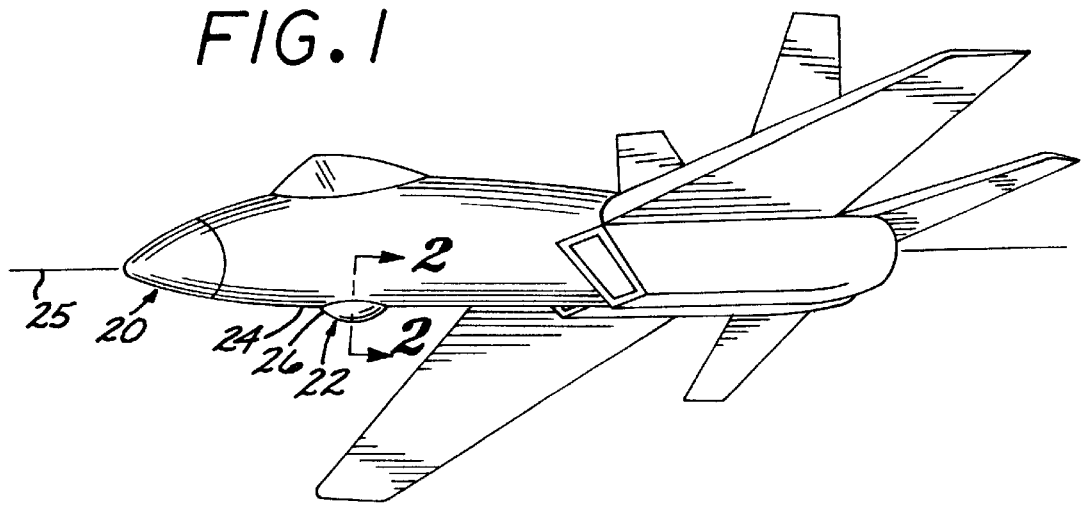
FIG. 1 is a perspective view of an aircraft using a look-down optical system.

FIG. 1 depicts an aircraft 20 having a look-down optical system 22 mounted to the underside of its fuselage 24. The fuselage 24 has a longitudinal axis 25. The only externally visible portion of the optical system 22 in FIG. 1 is a window 26.

Figure 2A:
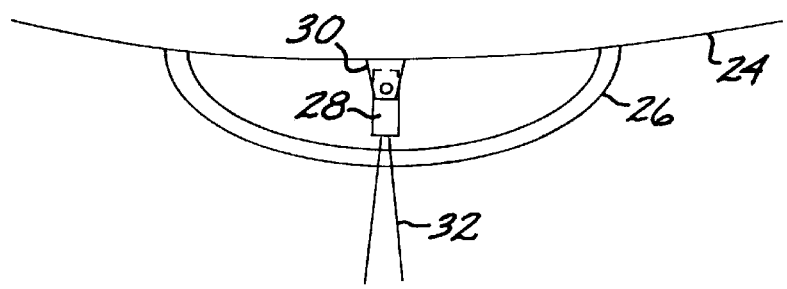
FIG. 2A is a sectional view of the optical system taken along line 2—2 of FIG. 1, with the telescope pointed downwardly at a low azimuthal angle.
Figure 2B:
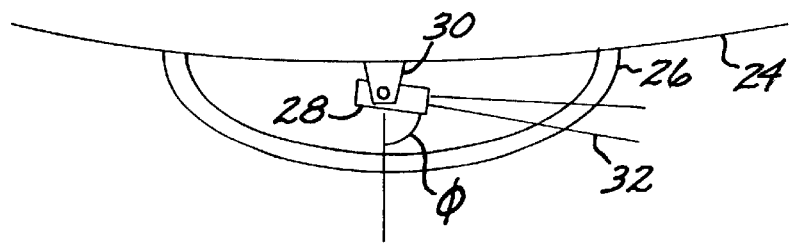
FIG. 2B shows the same optical system with the telescope pointed to a higher azimuthal angle.

FIGS. 2A–2B are sectional views showing a telescope 28 of the optical system 22. The telescope 28 contains the movable components of the optical system 22, to be discussed subsequently in detail. The telescope 28 is mounted on a gimbaled mount 30 so that it may be pivoted in two angular directions, an elevational (front to back, relative to the longitudinal axis 25 of the fuselage 24) angle $\theta$ and an azimuthal (side to side, relative to the longitudinal axis 25 of the fuselage 24) angle $\phi$. FIG. 2A shows the telescope 28 oriented at a small, nearly straight down, azimuthal angle $\phi$, and FIG. 2B shows the telescope 28 oriented at a higher azimuthal angle. The field of view 32 of the telescope 28 in the orientation of FIG. 2A is nearly perpendicular to the surface of the window 26, while the field of view of the telescope in the orientation of FIG. 2B is at an angle to the surface of the window that is more inclined. The wavefront distortion of the image is different in the two cases, and generally is greater for the higher azimuthal angle of FIG. 2B. Similar considerations hold for variations in the elevational angle as the telescope is gimbaled in the $\theta$ direction.

FIG. 3 illustrates the optical system 22 and ray paths therethrough in greater detail. A beam 40 in the form of an image of an external scene 41 passes along an optical path 42 and through the window 26. Inside the window 26, the beam 40 enters the telescope 28, whose components are illustrated schematically inside the telescope 28. Inside the telescope 28, the beam 40 passes through a static corrector 44 lying on the optical path 42. The beam 40 is shaped, sized, and focused by appropriate conventional optics selected for the internal structure and requirements of the telescope 28, here depicted for the preferred embodiment as three mirrors 46a, 46b, and 46c. Lenses may be used in addition to or instead of the mirrors 46a, 46b, and 46c.

The beam 40 passes through a dynamic corrector 48 lying on the optical path 42, and thereafter impinges upon a sensor 50. The sensor 50 is selected according to the information to be sensed, and may be an infrared, visible-light, or ultraviolet sensor, for example. The output of the sensor 50 is an electrical signal provided to processing electronics 52. Sensors 50 of various types and their associated electronics 52 are known in the art.

The components of the optical system 22 have been described in a preferred arrangement, but any other operable arrangement may be used. The order and relative positioning of the static corrector 44, the mirrors 46a, 46b, and 46c, and the dynamic corrector 48 may be varied, with the only limitation being that they are positioned optically between the sensor 50 and the external scene 41 being viewed.

The aberration introduced as wavefront distortion into the optical beam 40 by its passage through the window 26 and possibly other sources may be considered as two parts, a fixed portion and a variable portion. The present optical system 22 uses two components to introduce a counter-distortion into the beam 40 prior to its reaching the sensor 50. The static corrector lens 44 introduces a fixed counter-distortion, and the dynamic corrector lens 48 introduces a controllable, varying counter-distortion. The static corrector lens 44 may also be viewed as subtracting a constant bias aberration from the beam 40, so that the dynamic corrector lens 48 processes only the variable portion of the aberration that depends upon the pointing angle of the sensor relative to the window. Acting together, the two types of counter-distortion substantially negate the effect of the distortion introduced into the optical beam by the window 26 and other components of the optical system over a wider dynamic range than is possible only with a dynamic corrector.

The static corrector 44 is at least one fixed optical element whose shape, position along the optical path 42, and rotational orientation do not change. The static corrector lens 44 may include a single lens, as shown, or multiple lenses, or it may include other optical devices such as a phase plate. It may also be provided as one or more lens groups. For example, telescope azimuthal angles φ of from −10 to +10 degrees may require a first "fixed" group of the static corrector lens 44, telescope azimuthal angles φ of from −20 to −10 degrees and from +10 to +20 degrees may require a second "fixed" group of the static corrector lens 44, and so on. A static corrector lens translation mechanism may be provided to change groups of the static corrector lens 44 in this situation, removing one of the groups from the optical path and replacing it with another.

The required optics of the static corrector lens or lenses cannot be stated as a universal design applicable to all situations. Instead, it is determined during system design and calibration procedures such as those described subsequently in relation to FIG. 5. For each window type or even for each individual window, the aberration as a function of pointing angle of the sensor is determined, and separated into angle-dependent and angle-independent terms. The static corrector lens or lenses are selected and prepared according to well-established optical principles to correct the angle-independent portion. As noted in the preceding paragraph, multiple static corrector lens groups may be provided along with the static corrector lens translation mechanism.

The dynamic corrector lens includes optical elements that provide selectively varying astigmatism, power (also called focus), and coma counter-distortion. FIG. 4 illustrates a preferred form of the dynamic corrector lens 48. This preferred form utilizes five separate parallel lenses which are controllably movable as will be described.

A first lens 60 has a first lens surface 62 and a cylindrical second lens surface 64. A second lens 66 includes a cylindrical first lens surface 68 in a facing-but-spaced apart relation to the second lens surface 64 of the first lens 60, and a spherical or aspherical second lens surface 70. A third lens 72 has a spherical or aspherical first lens surface 74 in facing-but-spaced-apart relation to the spherical or aspherical second lens surface 70 of the second lens 66, and a second lens surface 76. A fourth lens 78 has a first lens surface 80 in facing-but-spaced-apart relation to the second lens surface 76 of the third lens 72, and a third-order aspheric second lens surface 82. A fifth lens 84 has a third-order aspheric first lens surface 86 in facing-but-spaced-apart relation to the second lens surface 82 of the fourth lens 78, and a second lens surface 88. Those surfaces of the lenses not otherwise specified are flat in the illustrated preferred embodiment, but they may be curved in other embodiments to achieve other objectives.

The lenses 60, 66, 72, 78, and 84 are movable in various directions and in various combinations. A first linear drive 100 controllably moves the first lens 60 along a track 102 in a direction parallel to the optical path 42. A second linear drive 104 controllably moves the second lens 66 linearly along the track 102. A third linear drive 106 controllably moves the third lens 72 linearly along the track 102. A fourth linear drive 108 controllably moves the fourth lens 78 in a direction perpendicular to the optical path 42. A fifth linear drive 110 controllably moves the fifth lens 84 in a direction perpendicular to the optical path 42. A first rotational drive 112 rotates the first lens 60, the second lens 66, and the third lens 72 as a group about the optical path 42. A second rotational drive 114 rotates the fourth lens 78 about the optical path 42 relative to the fifth lens 84.

These drives act in a coordinated fashion to change the spacings and rotational positions of the lenses. For example, to change the spacing between the first lens 60 and the second lens 66, either the first linear drive 100 or the second linear drive 104 may be operated. If the second linear drive 104 is operated, the spacing between the second lens 66 and the third lens 72 will change as well, unless the third linear drive 106 is operated as well to maintain that spacing constant. Operating the drives in a coordinated fashion is readily accomplished by the computer-controlled system of the invention.

The following discussion of the effective optical correction procedures is made with the preceding discussion in mind. Thus, for example, the discussion of an "astigmatism-correcting linear drive" refers to the coordinated movement of the first and second lenses, accomplished with an operable combination of the specific drives 100 and 104 that may accomplish the movement. Other movements produced by the other drives may be required simultaneously to avoid unintended changes to the other optical parameters.

The astigmatism-correcting linear drive is operable to change the spacing between the first lens 60 and the second lens 66. The changing of the spacing between the cylindrical lens surfaces 64 and 68 controls the degree of astigmatism. A focus-correcting (or power-correcting) linear drive is operable to change the spacing between the second lens 66 and the third lens 72. The changing of the spacing between the spherical or aspherical lens surfaces 70 and 74 changes the degree of focus. An astigmatism-correcting rotational drive (drive 112) is operable to rotate the first lens 60, the second lens 66, and the third lens 72 as a group about the optical path 42, changing the angular orientation of the astigmatism produced by the cylindrical lens surfaces 64 and 68. A coma-correcting linear drive (either or both of drives 108 and 110) is operable to move at least one of the fourth lens and the fifth lens in a direction perpendicular to the optical path. This relative movement changes the degree of coma produced by the lenses 78 and 84. A coma-correcting rotational drive (drive 114) is operable to rotate the fourth lens 78 and the fifth lens 84 relative to each other about the optical path 42. This coma-correcting rotation changes the angular orientation of the coma correction produced by the relative positioning of the lenses 78 and 84. See also U.S. Pat. No. 5,526,181, whose disclosure is incorporated by reference.

Figure 5:
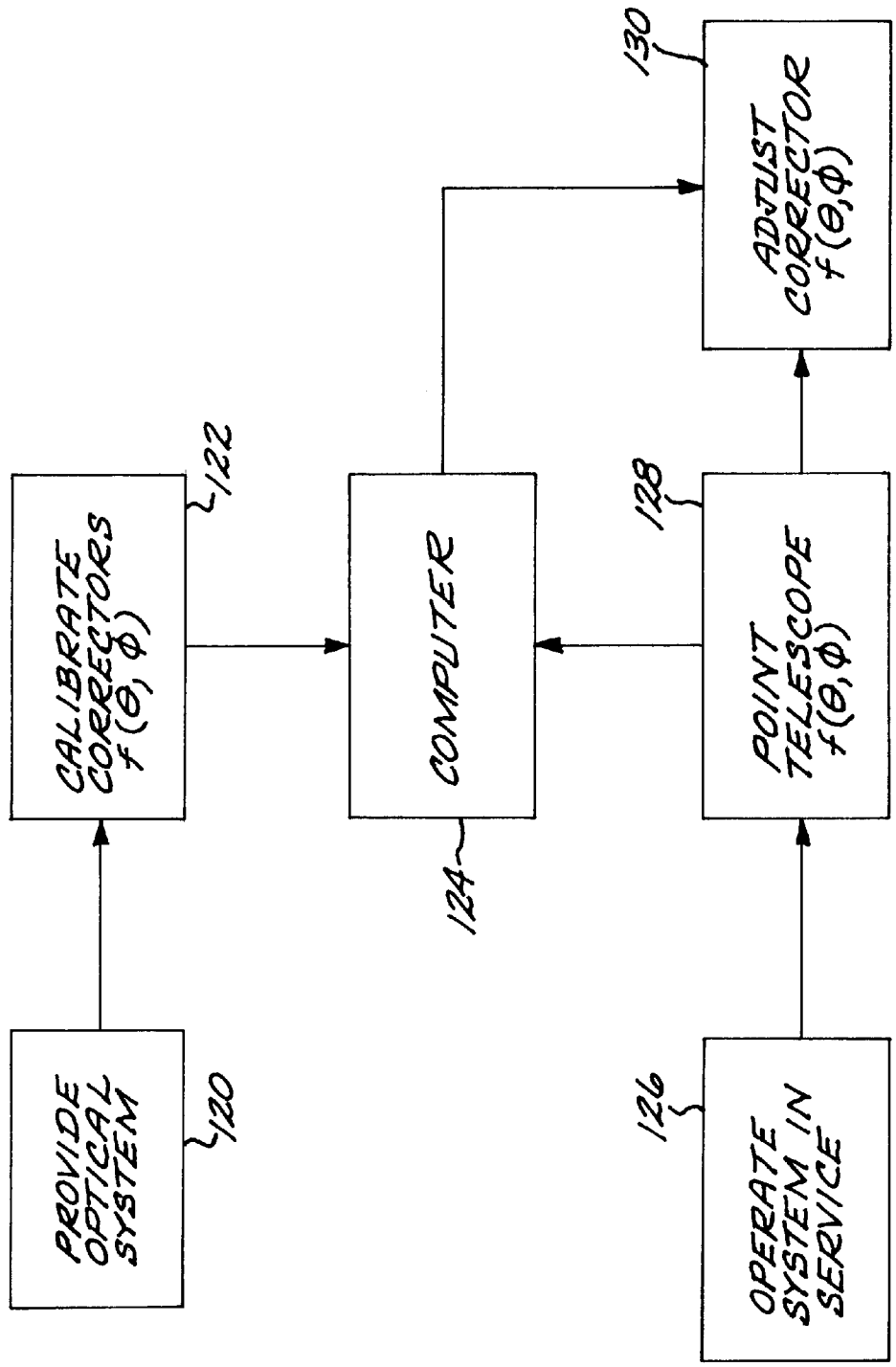
FIG. 5 is a block diagram of a preferred utilization of the present invention.

FIG. 5 illustrates the preferred manner of using the optical system of the invention. The optical system 22 is provided, numeral 120, preferably the optical system described herein. The correctors of the optical system are calibrated while viewing the external scene through the window, numeral 122, by placing a calibration image in the field of view 32 of the sensor 50 with the gimbal mount 30 set to a selected value of elevation angle θ and azimuth angle φ, and measuring the optical quality and aberration of the resulting image. The values of θ and φ are changed, and the process repeated. A table for the aberration of the beam as a function of pointing angle of the sensor is accumulated by further repeating the process. Once the aberration as a function of angle is determined in this fashion, the aberrations are analyzed as a fixed or angular-independent component and a variable or angular-dependent component. The static corrector 44 is fabricated to correct for the fixed or angle-independent component and the settings of the dynamic corrector to correct for the variable or angular-dependent component are determined and stored as a function of elevation angle θ and azimuth angle φ in a look-up table of an onboard computer 124 for the angle-dependent component of the aberration.

When the optical system 22 is placed into service, numeral 126, the operator points the telescope 28 and thence the sensor 50 in a selected direction, establishing values of θ and φ, numeral 128. The values of the settings of the dynamic corrector 48, for the selected values of θ and φ are looked up in the computer, numeral 124, and supplied to the dynamic corrector 48, numeral 130. The dynamic corrector 48 adjusts the drives to these settings. The sensor thereafter observes the scene through the static corrector 44 and the dynamic corrector 48 to achieve optimal reduction of aberration. If either θ or φ is changed by re-aiming the pointing angle of the sensor, the dynamic corrector 48 is adjusted to the settings corresponding to these new pointing angles.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. An optical system having an optical path along which a beam travels, the optical system comprising:
   a window lying on the optical path, the window introducing an aberration wavefront distortion into the beam; and
   an aberration corrector, including
      a static corrector lying on the optical path, the static corrector introducing a fixed counter-distortion into the beam, and
      a dynamic corrector lying on the optical path, the dynamic corrector being controllably variable to correct aberration in the beam, wherein the dynamic corrector comprises an astigmatism generator, a power generator, and a coma generator.

2. The optical system of claim 1, wherein the static corrector comprises at least one fixed lens.

3. The optical system of claim 1, wherein the window is a conformal window on an aircraft.

4. The optical system of claim 1, wherein the dynamic corrector comprises
   a first astigmatism-correcting lens having
      a first astigmatism-correcting lens surface, and
      a cylindrical second astigmatism-correcting lens surface,
   a second astigmatism-correcting lens having
      a cylindrical first astigmatism-correcting lens surface in facing-but-spaced-apart relation to the second astigmatism-correcting lens surface of the first astigmatism-correcting lens, and
      a second astigmatism-correcting lens surface, and
   an astigmatism-correcting drive operable to change the spacing between the first astigmatism-correcting lens and the second astigmatism-correcting lens.

5. The optical system of claim 1, wherein the dynamic corrector comprises
   a first coma-correcting lens having
      a first coma-correcting lens surface, and
      a third-order aspheric second coma-correcting lens surface,
   a second coma-correcting lens having
      a third-order aspheric first coma-correcting lens surface in facing-but-spaced-apart relation to the second coma-correcting lens surface of the first coma-correcting lens, and
      a second coma-correcting lens surface, and
   a coma-correcting drive operable to move at least one of the first coma-correcting lens and the second coma-correcting lens in a direction perpendicular to the optical path.

6. The optical system of claim 1, wherein the dynamic corrector comprises
   a first focus-correcting lens having
      a first focus-correcting lens surface, and
      a spherical or aspherical second focus-correcting lens surface,
   a second focus-correcting lens having
      a spherical or aspherical first focus-correcting lens surface in facing-but-spaced-apart relation to the second focus-correcting lens surface of the first focus-correcting lens, and
      a second focus-correcting lens surface, and
   a focus-correcting drive operable to change the spacing between the first focus-correcting lens and the second focus-correcting lens.

7. The optical system of claim 1, further including a sensor lying on the optical path.

8. An optical system having an optical path along which a beam travels, the optical system comprising:
   an aberration corrector, including
      a static corrector lying on the optical path, and
      a dynamic corrector lying on the optical path, the dynamic corrector being controllably variable to correct aberration in the beam, the dynamic corrector comprising
         an astigmatism generator,
         a power generator, and
         a coma generator.

9. The optical system of claim 8, wherein the static corrector comprises at least one fixed lens.

10. The optical system of claim 8, wherein the dynamic corrector comprises
   a first astigmatism-correcting lens having
      a first astigmatism-correcting lens surface, and
      a cylindrical second astigmatism-correcting lens surface,
   a second astigmatism-correcting lens having
      a cylindrical first astigmatism-correcting lens surface in facing-but-spaced-apart relation to the second astigmatism-correcting lens surface of the first astigmatism-correcting lens, and
      a second astigmatism-correcting lens surface, and
   an astigmatism-correcting drive operable to change the spacing between the first astigmatism-correcting lens and the second astigmatism-correcting lens.

11. The optical system of claim 8, wherein the dynamic corrector comprises
   a first focus-correcting lens having
      a first focus-correcting lens surface, and
      a spherical or aspherical second focus-correcting lens surface,
   a second focus-correcting lens having
      a spherical or aspherical first focus-correcting lens surface in facing-but-spaced-apart relation to the second focus-correcting lens surface of the first focus-correcting lens, and
      a second focus-correcting lens surface, and
   a focus-correcting drive operable to change the spacing between the first focus-correcting lens and the second focus-correcting lens.

12. The optical system of claim 8, wherein the dynamic corrector comprises
   a first coma-correcting lens having
      a first coma-correcting lens surface, and
      a third-order aspheric second coma-correcting lens surface, a second coma-correcting lens having
  a third-order aspheric first coma-correcting lens surface in facing-but-spaced-apart relation to the second coma-correcting lens surface of the first coma-correcting lens, and
  a second coma-correcting lens surface, and
a coma-correcting drive operable to move at least one of the first coma-correcting lens and the second coma-correcting lens in a direction perpendicular to the optical path.

13. The optical system of claim 8, wherein the dynamic corrector comprises
a first lens having,
  a first lens surface, and
  a cylindrical second lens surface,
a second lens having
  a cylindrical first lens surface in facing-but-spaced-apart relation to the cylindrical second lens surface of the first lens, and
  a spherical or aspherical second lens surface,
a third lens having
  a spherical or aspherical first lens surface in facing-but-spaced-apart relation to the spherical or aspherical second lens surface of the second lens, and
  a second lens surface,
a fourth lens having
  a first lens surface in facing-but-spaced-apart relation to the second lens surface of the third lens, and
  a third-order aspheric second lens surface, and
a fifth lens having
  a third-order aspheric first lens surface in facing-but-spaced-apart relation to the second lens surface of the fourth lens, and
  a second lens surface.

14. The optical system of claim 13, further including
an astigmatism-correcting linear drive operable to change the spacing between the first lens and the second lens,
a focus-correcting linear drive operable to change the spacing between the second lens and the third lens,
an astigmatism-correcting rotational drive operable to rotate the first lens, the second lens, and the third lens as a group about the optical path,
a coma-correcting linear drive operable to move at least one of the fourth lens and the fifth lens in a direction perpendicular to the optical path, and
a coma-correcting rotational drive operable to rotate the fourth lens and the fifth lens relative to each other about the optical path.

15. The optical system of claim 8, further including
a window lying on the optical path.

16. The optical system of claim 15, wherein the window is a conformal window on an aircraft.

17. The optical system of claim 8, further including
a sensor lying on the optical path.

18. An optical system having an optical path along which a beam travels, the optical system comprising:
an aberration corrector, including
  a static corrector lying on the optical path, the static corrector comprising at least one lens, and
  a dynamic corrector lying on the optical path, the dynamic corrector being controllably variable to correct aberration in the beam, the dynamic corrector comprising
    a first lens having
      a first lens surface, and
      a cylindrical second lens surface,
    a second lens having
      a cylindrical first lens surface in facing-but-spaced-apart relation to the cylindrical second lens surface of the first lens, and
      a spherical or aspherical second lens surface,
    a third lens having
      a spherical or aspherical first lens surface in facing-but-spaced-apart relation to the spherical or aspherical second lens surface of the second lens, and
      a second lens surface,
    a fourth lens having
      a first lens surface in facing-but-spaced-apart relation to the second lens surface of the third lens, and
      a third-order aspheric second lens surface,
    a fifth lens having
      a third-order aspheric first lens surface in facing-but-spaced-apart relation to the second lens surface of the fourth lens, and
      a second lens surface,
    an astigmatism-correcting linear drive operable to change the spacing between the first lens and the second lens,
    a focus-correcting linear drive operable to change the spacing between the second lens and the third lens,
    an astigmatism-correcting rotational drive operable to rotate the first lens, the second lens, and the third lens as a group about the optical path,
    a coma-correcting linear drive operable to move at least one of the fourth lens and the fifth lens in a direction perpendicular to the optical path, and
    a coma-correcting rotational drive operable to rotate the fourth lens and the fifth lens relative to each other about the optical path.

19. The optical system of claim 18, further including
a window lying on the optical path.

20. The optical system of claim 19, wherein the window is a conformal window on an aircraft.

21. The optical system of claim 18, further including
a sensor lying on the optical path.

* * * * *